United States Patent [19]
Oesterle et al.

[11] Patent Number: 5,743,146
[45] Date of Patent: Apr. 28, 1998

[54] INTERLOCKING DEVICE

[75] Inventors: Hans-Peter Oesterle, Tuningen; Heinz Schaefer, Villingen-Schwenningen; Wolfgang Blaffert, Rottweil, all of Germany

[73] Assignee: Binder Magnete GmbH, Germany

[21] Appl. No.: 635,301

[22] Filed: Apr. 19, 1996

[30] Foreign Application Priority Data

Apr. 20, 1995 [DE] Germany ................. 195 14 554.2

[51] Int. Cl.$^6$ ............... F16H 63/38; F16H 61/18; B60K 41/26
[52] U.S. Cl. ................. 74/475; 74/527; 192/4 A
[58] Field of Search ............... 74/475, 527; 192/4 A; 464/29

[56] References Cited

U.S. PATENT DOCUMENTS

| | | | |
|---|---|---|---|
| 2,983,121 | 5/1961 | Naas | 464/29 X |
| 4,539,862 | 9/1985 | Caldwell | 74/527 |

FOREIGN PATENT DOCUMENTS

| | | |
|---|---|---|
| 901249 | 1/1954 | Germany . |
| 1603091 | 10/1990 | U.S.S.R. ......... 464/29 |

OTHER PUBLICATIONS

Pagel, Dr.-Ing. E.O., Wählhebelsperren für Fahrzeuge mit Automatrik-Getriebe, *Internationale Kongress Messe für Automobiltechnik*, Oct. 19, 1988.

*Primary Examiner*—Allan D. Herrmann
*Attorney, Agent, or Firm*—Stein, Pendorf & Van Der Wall

[57] ABSTRACT

The locking device for locking of two relative to each other longitudinally moveable elements comprises an electromagnet including a magnetic yoke, an operating winding and a magnet armature. The operating winding and magnetic yoke are positionally fixed on the first element, while the magnet armature is fixed on the second element in respect to the longitudinal movement direction X. The magnet armature presses with one of its walls via a spring device against an opposing wall of the magnetic yoke. The walls of the magnet armature and magnetic yoke which lie opposed to each other are provided with an at least approximately form fitting register contour, so that magnet armature and magnetic yoke can be held in a locked position with respect to each other. For locking, the electromagnet is activated in the register position. Upon application of a predetermined amount of force in the longitudinal direction upon the first or second element the locking position can be release or disengaged.

18 Claims, 3 Drawing Sheets

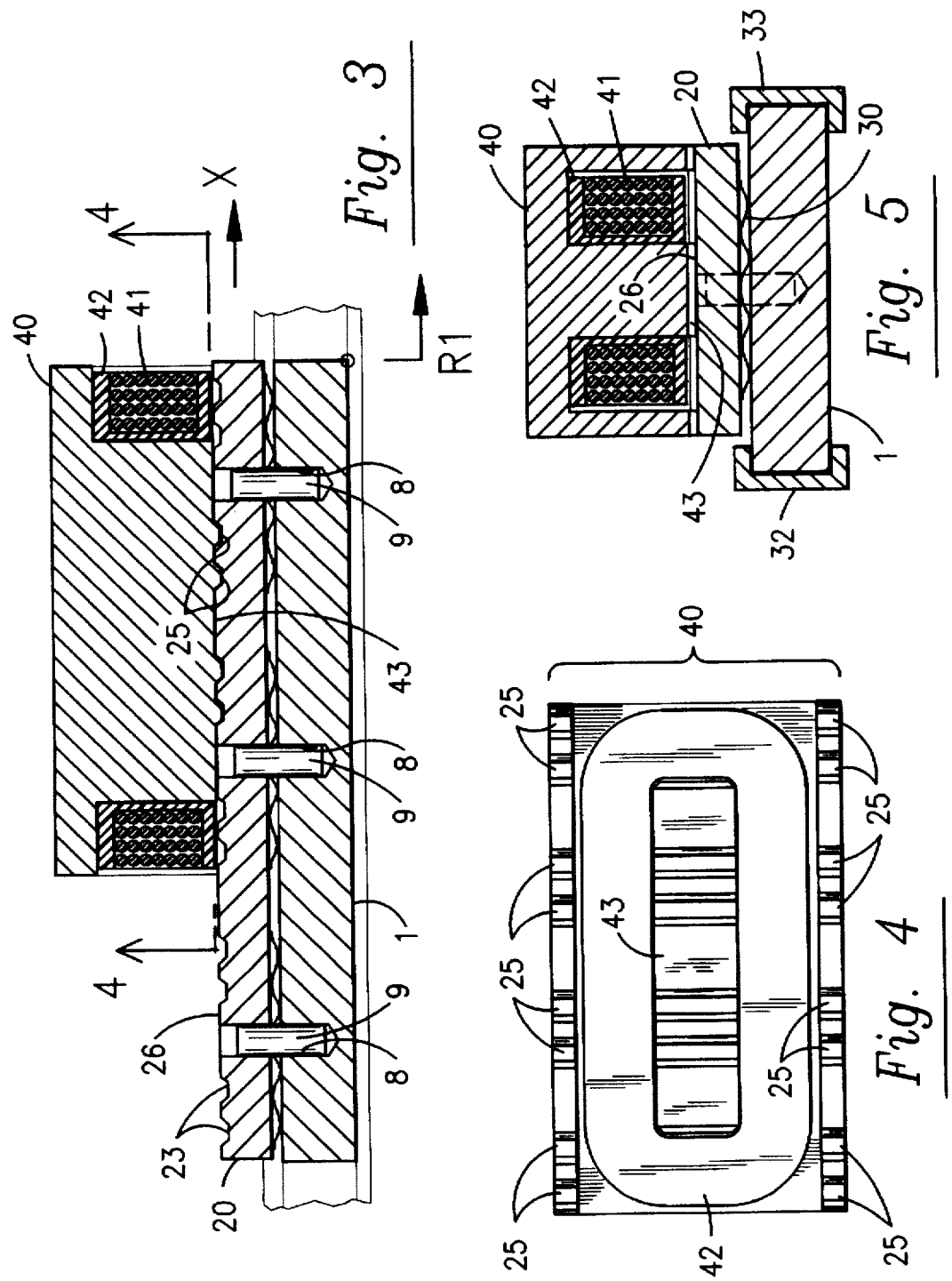

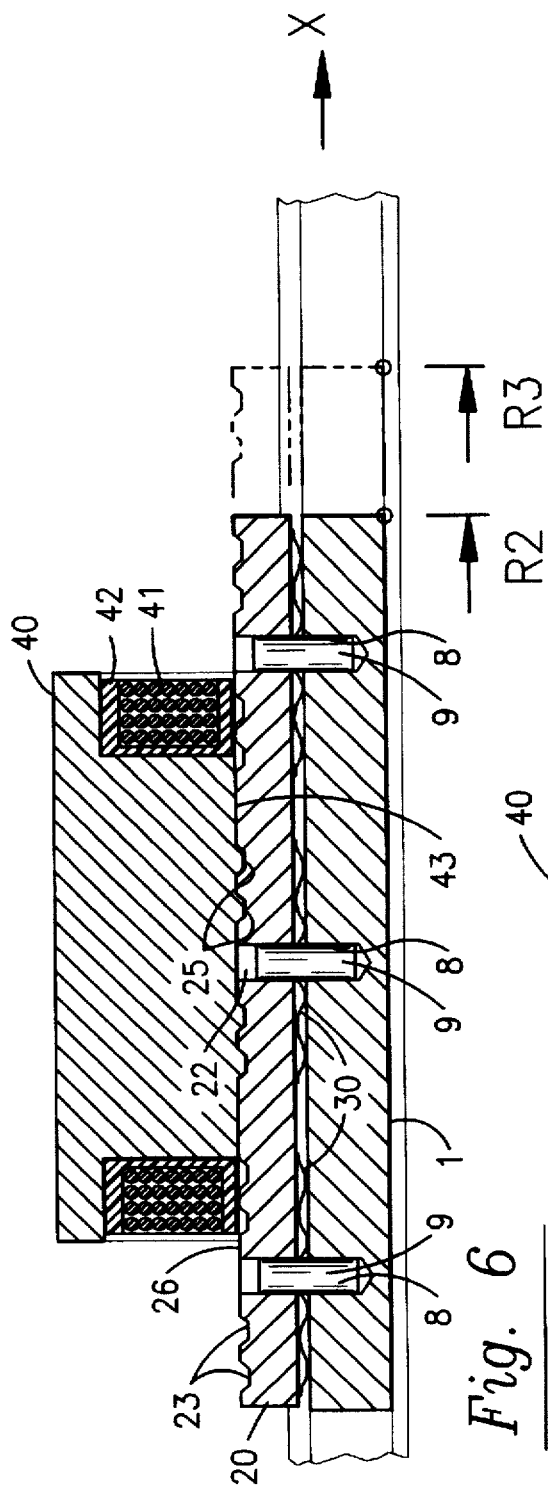

INTERLOCKING DEVICE

BACKGROUND OF THE INVENTION

1. Field of the Invention

The invention concerns an interlocking device for interlocking two elements which are longitudinally moveable relative to each other, and in particular for gear select lever devices for changing gears in automatic transmissions in automobiles, which insures a secure interlocking of two elements and in a panic situation permits a uncoupling of the two elements upon exceeding a predetermined force on the select lever.

2. Description of the Related Art

Interlocking devices with an electromagnet having a magnetic yoke, and operating winding and a magnetic armature are generally known and are employed for example in gear select levers for automatic transmissions in automobiles, wherein the magnetic yoke is coupled to an interlocking bolt. These interlocking devices serve to insure, that the start-up of the the driving process is enabled only after the operator has familiarized himself with the pedals of the automobile. It must be prevented, that the first single manipulation process of the pedals results in a forward propagation of the automobile.

This problem and a solution to this problem was introduced for example according to the lecture of Dr. Pagel in the International Congress Exhibition for Automobile Technology, which occurred from Oct. 19, 1988, until Oct. 21, 1988, in Sindelfingen, the lecture being entitled "Gear Selection Lever Blocking for Automobiles with Automatic Transmission". In order to prevent, in automobiles with automatic transmissions, that the automobile is engaged in gear, without the driver previously having tested the brake pedal, the gear select lever of the automatic transmission is retained in the position "P". For this there is employed an electromagnetic operated interlocking device, which upon actuation of the ignition pushes a locking bolt into a fork piece connected to the gear select lever. Therewith the gear select lever cannot be operated and the vehicle cannot be moved. Only after operation of the foot brake does the electromagnet become deactivated via the brake light switch, whereupon the locking bolt is extracted from the interlocking position and thereby the gear select lever is moveable out of the position "P".

This locking by means of a stably seated locking bolt within a borehole has however the significant disadvantage, that in a panic situation the inoperability may lead to a possibly life threatening situation when unlocking of the gear select lever out of the "P" position is no longer possible. It is quite conceivable that the case may arise that, for example an automobile with it's motor running comes to a stop at a railroad crossing, because for example the traffic light is indicating red, and the gear select lever is shifted into position "P" by the driver. Should the driver for any reason become panicked, for example because another automobile is approaching him in a dangerous manner, so then the driver will attempt to move the automobile as quickly as possible. In this case, he will possibly neglect to first step briefly on the brake pedal, in order to disengage the interlocking position of the gear select lever. It is more likely that he will immediately attempt to operate the gas pedal and will determine that the vehicle does not allow itself to be moved. In this panic situation he will likely press against or hammer on the gear select lever. As a result of the above-mentioned interlocking bolt which is seated in the borehole, he will not be able to move the gear select lever out of position "P" even with great exertion of force by hammering upon the gear select lever to bring it into the drive position "N". The conventional interlocking device can thus lead to a heightened risk of harm to life.

The present invention is concerned with the task, of designing an interlocking device, in particular for automatic transmission in automobiles, which insures a secure interlocking of two elements and in a panic situation permits a uncoupling of the two elements upon exceeding a predetermined force on the select lever.

SUMMARY OF THE INVENTION

In the inventive interlocking device for locking of two relative to each other longitudinally moveable elements with an electromagnet, the operating winding and the magnetic yoke are rigidly connected with a first element. The magnetic armature is in retrospect to the longitudinal movement direction likewise securely connected but however with a second element, whereby the magnetic armature with one of its walls urged against the opposing walls of the magnetic yoke and held thereagainst via a device, for example a spring device or a permanent magnet device. The opposing facing walls of the magnetic armature and magnetic yoke exhibit an at least approximately form-locking engaging contour, which at least causes a releasable detente condition between the magnetic armature and the magnetic yoke.

The inventive interlocking device makes it possible, thanks to the described arrangement of the electromagnet, that the register position be locked by activation of the electromagnet, that is, by energizing or as the case may be de-energizing the electromagnet, that is to provide a supplemental force, with which the magnet armature and the magnetic yoke are held together.

When employing multiple arrest conditions or positions each of these arrest positions can be locked by activation of the electromagnet. The locking is accomplished, in the case of an electro-arrest system, by energizing the operating winding and, in the case of permanent-electro-arrest systems, by de-energizing.

The detente contour between the magnetic yoke and the magnetic armature is provided with at least one, preferably however at least two, arrest positions, in which the opposing walls of the magnetic armature and the magnetic yoke lie against each other form-fittingly and gap free.

The detente contour can be accomplished by at least one cog-like projection and/or a notch-like indentation with respectively flattened or beveled edges against the opposing facing walls of the magnetic armature and/or the magnetic yoke. It is substantially necessary, that in the register position as well as also in the locked condition the register position can be unlocked relatively easily and interlocked condition can be released with force by bringing external forces to bear upon one of the two elements. As a result of the increased holding forces in the locking condition there are naturally higher forces necessary for unlocking, which however in the case of panic can be achieved without difficulty.

According to a further development of the invention the magnetic armature is secured to a second element via a securing device, wherein between the second element and the magnetic armature a spring device or permanent magnet device is seated, in order to press the magnetic armature in the direction of the magnetic yoke. With the spring device it is insured, that during the relative movement between the first and second elements the magnetic yoke and the magnet armature can be brought securely into their register position.

The locking condition of the magnetic yoke and magnetic armature is recognized by the fact that for a further movement of the first or, as the case may be, second element, a certain amount of force must be exerted, in order to exit from this detente position. Therewith the detente or register position is distinctively recognizable.

The magnetic armature is, in this illustrative example of the invention, preferably secured to the second element via guiding or, as the case may be, securing bolts. These bolts insure, that the magnet armature is securely held in position with the first element in respect to the longitudinal direction, but however is displaceable orthogonally to this direction.

When utilizing such guiding or, as the case may be, securing bolts, a suitable spring device can be situated between the second element and the magnet armature, for example, one or more plate springs.

The spring device insures therefore, that the magnet armature is urged in the direction of the magnetic yoke. During relative movement between the magnet armature and magnetic yoke the magnet armature is thus constantly urged in the direction of the magnetic yoke and so upon reaching a register position is likewise pushed into this register position.

The relative movement between the magnetic yoke and the magnet armature and therewith between the two elements, which are connected via the electromagnet, is not limited to a linear movement between the first and second elements. Rather there can, in the place of a straight linear movement of the first or second element, also be contemplated a rotational movement of the first or second elements about a rotation point. It is essentially only necessary, that the opposing walls of the magnet armature and the magnetic yoke are contacting each other and in the case of arriving at a register position are held locked to each other. This register position is preferably in accordance with the invention made to fit flush, so that upon energizing of the electromagnet (or in certain cases upon de-energizing of the electromagnet in the case of a permanent electro-arresting system) very high magnetic forces are brought to bear between the magnetic yoke and the magnet armature and locking is insured.

In the preferred illustrative embodiment of the invention two registers positions are exhibited by the opposing walls of the magnetic yoke and magnet armature, in which the magnet armature exhibits on its face a ring shaped protrusion and the magnetic yoke exhibits two overlapping and adjacent to each other lying, ring shaped notches corresponding to the ring shaped protrusion. A design of the register contour of this type is employable for example for the gear select lever device in automatic transmission automobiles, wherein the first register position corresponds to the position of the gear select lever "P" and the second register position correspond to a different position of the gear select lever.

The magnet armature is preferably designed to be plate shaped, so that a relatively small construction depth of the first element of the locking device results. Beyond this the plate surface of the magnet armature is preferably constructed to be larger than the facing wall of the magnetic yoke, so that two or more register positions can be provided on the wall of the magnet armature facing the magnetic yoke in the form of stop detente protrusions or stop detente notches.

The coil axis of the operating winding is arranged approximately orthogonal to the opposing, each other facing walls of magnet armature and magnetic yoke. Hereby there results in the case of an energizing of the operating winding in the case of use of an electromagnet an optimal utilization of holding forces of the magnet armature to the magnetic yoke.

The invention is next described in connection with two illustrative embodiments by means of the figures. There are shown:

BRIEF DESCRIPTION OF THE DRAWINGS

FIG. 7 the locking device according to FIG. 3 in its second register position with the plate spring replaced by a permanent magnet.

DETAILED DESCRIPTION OF THE INVENTION

In the following Figures, the same reference numbers represent, unless otherwise indicated, the same parts having the same meaning.

Figure 1:
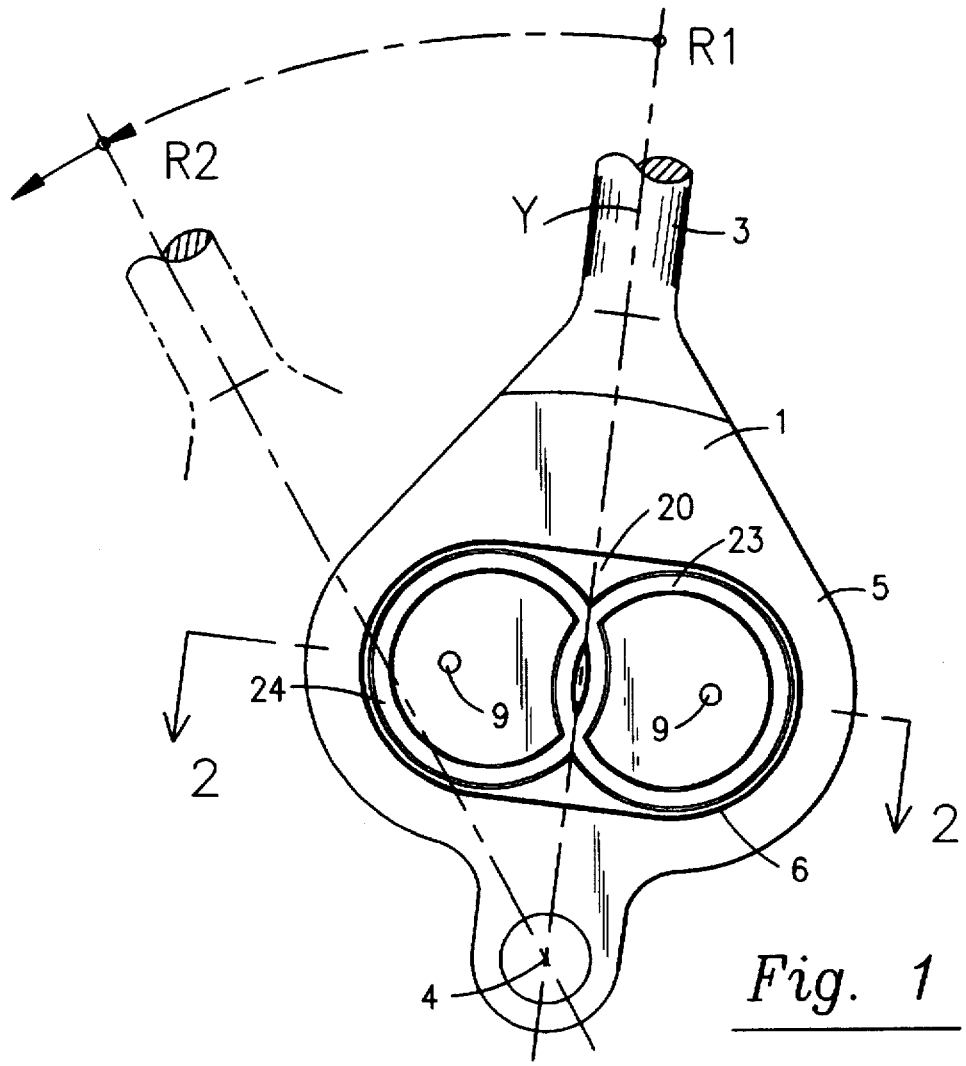
FIG. 1 A first illustrative embodiment of a locking device according to the invention with sectionally represented gear select lever of an automatic transmission of an automobile and electromagnet, FIG. 2 a sectional view through the locking device of FIG. 1 according to the indicated section line 2—2, FIG. 3 a sectional view through the second embodiment example of a locking device in its first register position according to the invention with an electromagnet, FIG. 4 top view of a face side of the magnetic yoke of the electromagnet of FIG. 3 according to the section line 4—4, FIG. 5 a sectional view of the locking device rotated about 90° in comparison to FIG. 3, and FIG. 6 the locking device according to FIG. 3 in its second register position.
Figure 2:
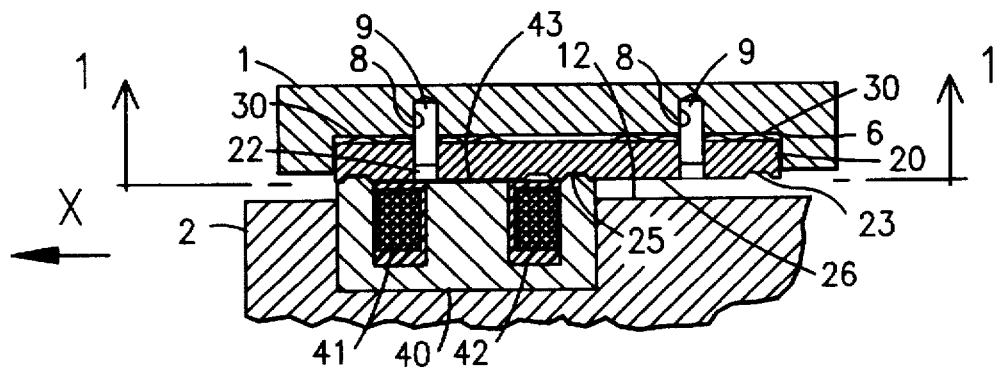

In FIG. 1 there is sectionally shown a first element 1 constructed as a select lever of a select-lever gear-change device, which in this example can be employed with an automatic transmission of an automobile. The first element 1 includes a select lever 3, which is moveable about a pivot point 4 from its first register position R1 and a second register position R2 (shown with broken lines). Between the select lever 3 and the pivot point 4 the first element 1 exhibits a broadened area 5, which, as can be seen in FIG. 2, contains a recess 6.

In the present illustrative embodiment this recess 6, as shown in FIG. 1, is provided with two parallel running and respectively to the section line 2—2 equally spaced and respectively orthogonal to the axis Y of the select lever 3 lying boarder lines, which respectively on their edges are connected with each other in the manner of semi-circles. These recesses 6 could however also for example be right angled or quadratic in design.

In this recess 6 in the first element 1 there is seated a plate shaped magnet armature 20 which is adapted to fit approximately in the outer contour of recess 6. The magnet armature 20 is connected to the first element 1 via two guide bolts 9. The two spacially separated guide bolts 9 are seated in corresponding boreholes 8 of the first element 1 and protrude with their ends which project out of the first element 1 into the corresponding borehole 22 of the magnetic armature 20. The guide bolts 9 do not protrude beyond the oppositely facing outer wall 26 of the magnet armature 20 of the first element 1.

Upon movement of the first element 1 and therewith the gear select lever 3 out of the first register position R1 according to the direction indicated by the arrow in FIG. 1 to the second register position R2, the magnet armature moves within the recess 6 at the same time along with the first element 1.

Between the first element 1 and the magnetic armature 20 there is provided a spring device such as a plate spring 30. In the illustrative embodiment according to FIGS. 1 and 2 this spring device is comprised respectively of a plate spring 30 situated about the guide bolt 9. In the place of this spring device there could also be provided a permanent magnet 31 (FIG. 7), which urges the magnet armature 20 against the magnetic yoke 40.

As a result of the spring force of this plate spring 30 the magnet armature 20 is pressed away from the first element 1. Upon the wall 26 of the magnet armature 20 lying opposite the first element 1, the second element 2 of the locking device is situated or provided. In this second element 2, which essentially is represented sectionally in FIG. 2, there is to be found a magnetic yoke 40 inclusive of operating winding 41 which is wound upon coil carrier body 42.

The magnetic yoke 40, which in the present illustrative embodiment according to the cross-sectional representation of FIG. 2 is designed or constructed approximately W-shaped, protrudes with its face side wall 43 beyond the face side wall 12 of the second element 2 and lies against the wall 26 of the magnet armature 20.

As discussed, the magnet armature 20 is urged in the direction of the magnetic yoke 40 of the electromagnet thanks to the plate spring 30. In the illustrative embodiment according to FIG. 2 the magnet armature 20 and the magnet armature 40 are positioned in the register position R1. For this the opposing walls 26, 43 of the magnet armature 20 and the magnet yoke 40 are provided with a suitable register contour. In the illustrative embodiment according to FIGS. 1 and 2, this register contour is comprised therein, that the wall 26 of the magnet armature 20 is constructed with two overlapping ring shaped notches 23, 24 according to FIG. 1. The ring shaped notches 23, 24 exhibit an approximate circular shape, which are adapted to fit the radius of the above-mentioned semicircular recess 6. The two ring shaped notches 23, 24 transect in this illustrative embodiment with a segment-like about along the axis Y which runs along the gear select lever 3 in the direction of the pivot point 4.

The face side of the wall 43 of the magnetic yoke 40 lying opposite to the wall 26 of the magnet armature 20 is provided with a ring shaped protrusion 25, which has the identical radius as the ring shaped notch 23 or as the case may be 24. Both the ring shaped protrusion 25 as well as also the ring shaped notch 23, 24 are provided with beveled edges, so that the magnetic yoke 40 and magnet armature 20, and therewith the second element 2 and the first element 1, can be pushed out of their respective locked positions, so long as the prescribed amount of force is exerted in the longitudinal direction X.

In order to be able to actually move the magnet armature 20 and the magnetic yoke 40 relative to each other upon the exercise of the predetermined amount of force in the longitudinal direction X, in which case the plate springs 30 as a result of this push force must be compressed, it is necessary, that the notches 23, 24 and the protrusions 25 are so constructed, that the protrusion 25 can slip out of the notch 23, 24. In the illustrative embodiment the side section according to FIG. 2 the notches 23, 24 and the protrusion 25 are respectively provided with beveled edges. They could however just as well have a semicircular cross-sectional or circle segment shaped notch and a cross-sectional approximately semicircular or circle segment shaped protrusion.

The design of the notches 23, 24 and protrusions 25 are in any case to be so selected, that the relative movement in a longitudinal direction X is possible and the magnet armature 20 can engage in its register position R1 or as the case may be R2 is as noiselessly as possible. In the register position R1 as the case may be R2 a flush contour mating between magnet armature 20 and magnetic yoke 40 is preferably achieved, so that the magnetic holding force upon energizing of the operating winding 41 is optimally utilized.

In the illustrative embodiment according to FIGS. 1 and 2 a magnet with a magnet armature 20 is employed as the electromagnet, which is comprised of a ferrous magnetic metal. If the operating winding 41 of the locking device is energized in the register position R1 or as the case may be R2, then the magnet armature is drawn even stronger to the face side wall 43 of the magnetic yoke 40. Hereby the desired locking is achieved.

If the driver for example in a panic situation strikes in that condition upon the gear select lever 3, then the locking device can advantageously be released.

Insofar as the electromagnet employed is a permanent electro-arresting system, the locking condition between magnet armature 20 and magnetic yoke 40 is achieved upon de-energization of operating winding 41. If on the other hand the operating winding 41 is energized with current in the appropriate current direction, then the action of the magnet can be compensated and the locking position can be released.

In the following FIGS. 3 through 6 a second illustrative embodiment of a locking device according to the invention is presented, in which the second element 2 is likewise fixed in its position, however the first element 1 is moveable linearly along a longitudinal direction X. The already known reference numbers correspond again to the same parts.

In the illustrative embodiment according to FIG. 3, which represents a segment section of a sectional representation of the inventive locking device, the magnetic yoke 40 together with the operating coil 41 wound upon coil carrier body 42 can be recognized. The face side wall 43 of the magnetic yoke 40 is provided with protrusions 25, which in the present illustrative embodiment run parallel to each other. Lying opposite to the magnetic yoke 40 there is positioned the first element 1 of the locking device, which via guide bolts 9 and the spring device 30 in the form plate springs presses the magnet armature 20 with its face side wall 26 against the wall 43 of the magnetic yoke 40. In FIG. 3 the locking device is to be found in its first register position R1.

In this first register position R1 the parallel to each other arranged protrusions 25 engage in groove like notches 23 of the magnet armature 20. Also in this illustrative embodiment, shown in FIG. 3, the edges of the notches 23 or as the case may be the protrusions 25 are beveled in order to make possible a linear movement of the magnet armature 20 and therewith the first element 1 in the longitudinal direction X. In order to make possible a movement of the magnet armature 20 and therewith the first element 1 also in the opposite direction, the above-mentioned bevels of notches 23 or as the case may be protrusions 25 are equally canted on the left and right of the notches 23 or as the case may be protrusions 25.

In FIG. 4 the top view of the magnetic yoke 40 with its associated parallel running protrusions 25 is to be seen.

In FIG. 5 likewise the locking device is sectionally represented, although rotated about 90° to the representation according to FIG. 3. The first element 1, which is moveable together with the magnet armature 20 relative to the fixed position magnetic yoke 40, is for example provided between suitable guide rails 32, 33.

While in FIG. 3 the locking device is shown in its first register position R1, there is to be seen in the sectional view according to FIG. 6, which corresponds to FIG. 3 with the exception of the position of the magnet armature 20 and therewith the first element 1 of the sectional view according to FIG. 3, the magnet armature 20 together with the first element 1 is in its second register position R2. The magnet armature 20 is moved to the right together with the first element 1, and this so far, that the protrusions 25 on the face side wall 43 of the magnetic yoke 40 come to lie inform-fitting engagement in the corresponding notches 23 on the face side wall 26 of the magnet armature 20. Insofar as the operating coil 41 is activated, that is in the case of an electric-locking system is energized and in the case of a permanent electric-locking system is de-energized, this register position R2 is locked.

Above and beyond this as indicated in FIG. 6 with dashed lines, one or more register positions are possible. The further register positions are shown in FIG. 3 with R3, wherein for reaching this register position R3 the magnet armature 20 together with the first element 1 must be moved farther to the right.

It is to be recognized that, in this case, it is not necessary that each of the provided register positions R1, R2 or R3 must be forcefully locked. There can for example, in the case of, as is conventional in case of automatic transmissions, essentially only the position "P" of the gear select lever be selected for locking. The other register positions correspond to the gear select positions "D" and "N" of the select lever, which need not be locked, which however require a definite register position.

It is understood, that the form fitting between the magnet armature 20 and the magnetic yoke 40 can have any desired shape, insofar as no unreleasable locking is hereby provided. The form locking between the magnet armature 20 and magnetic yoke 40 determines, together with the spring force of the spring device, such as plate springs 30, the force needed for the unlocking, and in the example of a gear select lever for automatic transmission, the force for unlocking of the gear select lever of the automatic transmission. The form fitting between the magnet armature 20 and the activated holding system determines thereagainst the force needed for shifting the gear select lever from the register position.

As shown in FIGS. 1 through 6, the arrest system can be circular or longitudinal shaped in design.

What is claimed is:

1. A locking device with an electromagnet for interlocking two longitudinally moveable elements (1, 2) moveable relative to each other along longitudinal axis (X), comprising:

a magnetic yoke (40) fixed in position relative to the second element;

an operative winding (41) fixed in position relative to the second element; and a magnet armature (20), fixed in position on the first element with respect to the longitudinal movement direction (X);

wherein activation of said magnet armature (20) results in interlocking of the two elements (1, 2);

wherein the magnet armature (20) is pressed with one of its walls (26) against an opposing wall (43) of the magnetic yoke (40) via a spring device;

wherein the walls (26, 43) of the magnet armature (20) and the magnetic yoke (40) which face each other are provided with an at least approximately form engaging register contour (23, 24, 25) defining releasable register positions (R1, R2, R3);

wherein upon the exceeding of a predetermined operating force in the longitudinal movement direction (X) upon one of the two elements (1, 2) the magnet armature (20) and the magnetic yoke (40) are capable of being moved out of their register position (R1, R2, R3) or, as the case may be, locking positions.

2. A locking device according to claim 1, wherein the register contour (23, 24, 25) is provided with at least one register position (R1, R2, R3), in which the opposite lying walls (26, 43) of the magnet armature (20) and magnetic yoke (40) lie form-fitting and flush against each other.

3. A locking device according to claim 2, wherein the register contour (23, 24, 25) includes at least two register positions (R1, R2).

4. A locking device according to claim 1, wherein at least one of the register positions (R1, R2, R3) is lockable by activation of the electromagnet.

5. A locking device according to claim 1, wherein the register contour (23, 24, 25) on the walls (26, 43) of the magnet armature (20) and/or the magnetic yoke (40) is formed with at least one cog-like protrusion (25) and/or a notch like groove (23, 24) with respectively beveled or flattened edges.

6. A locking device according to claim 1, wherein the magnet armature (20) is secured to the second element (2) via a securing device (9), and wherein between the second element (2) and the magnet armature (20) a spring device is situated in order to press the magnet armature (20) in the direction of the magnetic yoke (40).

7. A locking device according to claim 6, wherein the magnet armature (20) is fixed to the second element (2) against longitudinal movement (X) via securing bolts (9) and is secured so as to be moveable in a direction orthogonal to the longitudinal movement direction (X).

8. A locking device according to claim 6, wherein at least one plate spring (30) is provided between the second element (2) and the magnet armature (20).

9. A locking device according to claim 1, wherein one of the first and second element (1, 2) is fixed and the other of said first and second element (2, 1) is provided pivotable about a predetermined pivot point (4).

10. A locking device according to claim 1, wherein the first and second elements (1, 2) are linearly moveable relative to each other, wherein either the first or second element (1, 2) is anchored fixedly in the longitudinal movement direction (X).

11. A locking device according to claim 1, wherein the opposing walls (26, 43) of the magnet armature (20) and magnetic yoke (40) are provided with two register positions (R1, R2), in which the magnet armature (20) on its face side is provided with one of a ring shaped protrusion (25) or a ring shaped notch, and wherein the magnetic yoke (40) is provided with one of two overlapping and adjacent to each other lying, ring shaped notches (23, 24) or two overlapping and adjacent to each other lying, ring shaped protrusions (23, 24) which correspond to the ring shaped protrusion or notch (25).

12. A locking device according to claim 1, wherein the magnet armature (20) is plate shaped and exhibits a plate surface, which protrudes above the face side wall (43) of the magnetic yoke (40).

13. A locking device according to claim 1, wherein the operating winding (41) is oriented or provided with its coil axis approximately orthogonal to the opposing faces of walls (26, 43) of the magnet armature (20) and magnetic yoke (40).

14. A locking device according to claim 1, wherein the electromagnet urges the magnet armature (20) against the magnetic yoke (40) upon energizing of the operating winding (41).

15. A locking device according to claim 1, wherein the electromagnet is constructed as a permanent electro-holding magnet which upon de-energizing of energizing coil (41) urges the magnet armature (20) against the magnetic yoke (40).

16. A locking device according to claim 1, wherein the first and second element (1, 2) are components of a gear select lever device for an automatic transmission drive in an automobile.

17. A locking device according to claim 1, wherein the spring device which presses the magnet armature (20) against the magnetic yoke (40) is a plate spring (30).

18. A locking device according to claim 1, wherein the spring device, which presses the magnet armature (20) against the magnetic yoke (40), is a permanent magnet (31).

* * * * *